United States Patent [19]

Nakamura et al.

[11] 3,829,947
[45] Aug. 20, 1974

[54] MEANS FOR OPENING THE COVER OF A CASSETTE

[75] Inventors: Takeshi Nakamura; Yasuhiko Satoyoshi; Noboru Shimoda, all of Minami Ashigara, Japan

[73] Assignee: Fuji Photo Film Co., Ltd., Kanagawa, Japan

[22] Filed: June 25, 1973

[21] Appl. No.: 373,338

[30] Foreign Application Priority Data
June 23, 1972 Japan.............................. 47-63053

[52] U.S. Cl............................................... 29/200 D
[51] Int. Cl............................................ B23p 19/04
[58] Field of Search.......... 29/200 D, 200 B, 208 D, 29/427, 430

[56] References Cited
UNITED STATES PATENTS
3,742,586  7/1973  Butler et al...................... 29/200 D
3,768,133  10/1973  Scappator et al................. 29/200 D

*Primary Examiner*—Thomas H. Eager
*Attorney, Agent, or Firm*—Sughrue, Rothwell, Mion, Zinn & Macpeak

[57] ABSTRACT

This invention relates to means for opening the cover of a film cassette when it is inserted into, for example, a film loading device attached to an automatic film processer. The film loading device is provided with a light shielding cover to protect the cassette from ambient light. The light shielding cover is movable from a closed position to an open position. In the open position, the cassette is inserted into the film loading device. The cassette has, at its forward end, locking means which is unlocked when the cassette is fully pushed into the film loading device. A control member is pivotally mounted between the light shielding cover and the means in the film loading device which unlocks the cassette cover. When the light shielding cover is in the opened position to receive the cassette, the projection means prevents the engagement of the cassette cover unlocking means with the cassette cover locking device. When the light shielding cover is closed, the projection means is disengaged so that the cassette cover can be unlocked. Thus, the cassette can be opened only after the light shielding cover is closed.

5 Claims, 2 Drawing Figures

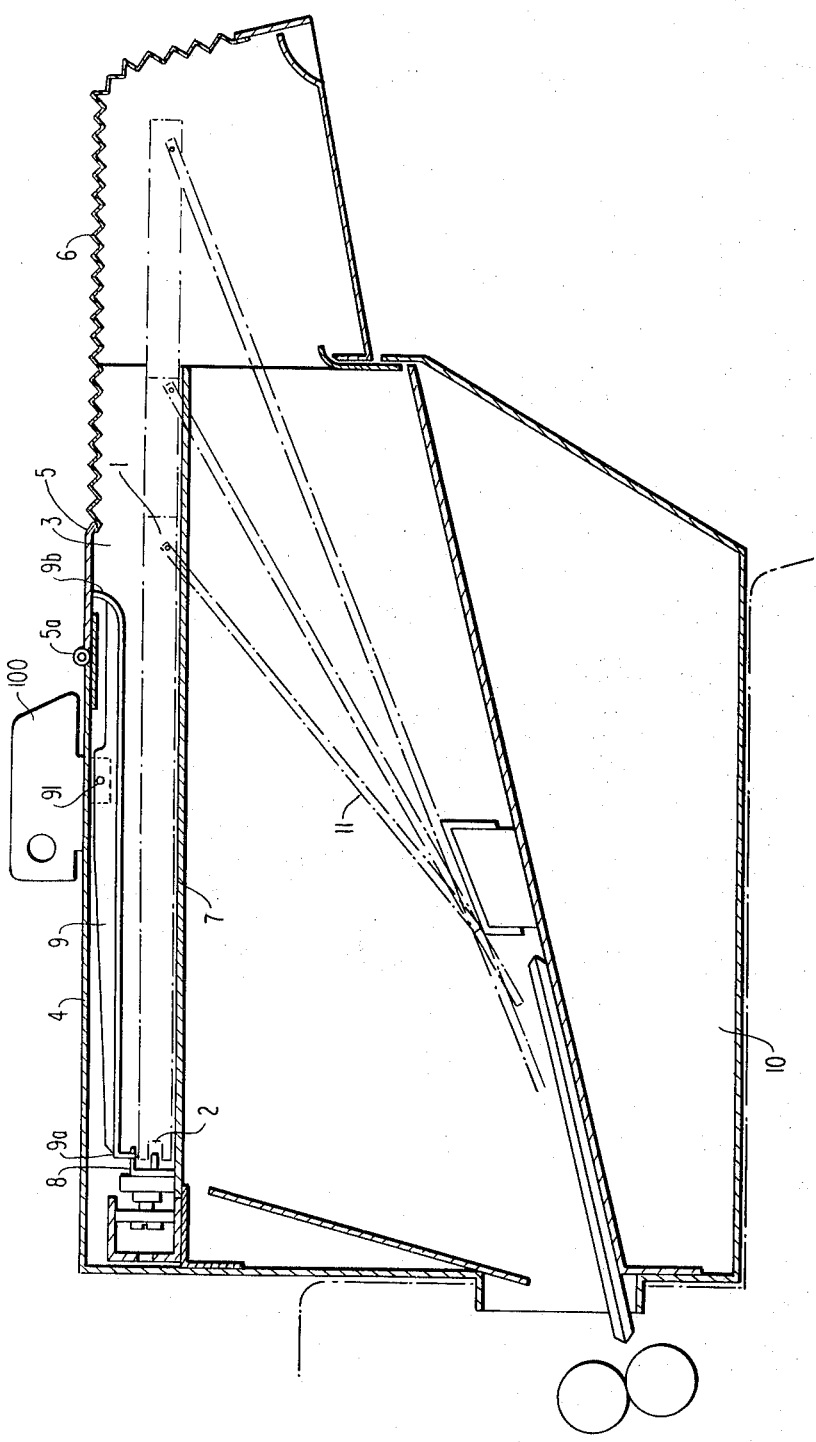

MEANS FOR OPENING THE COVER OF A CASSETTE

BACKGROUND OF THE INVENTION

1. Field of the Invention

This invention relates to a means for opening the cover of a film cassette, more particularly, to means for opening a hinged cover of a sheet film cassette to discharge the film into a film loading device, attached to an automatic film processor, in the presence of ambient light.

2. Description of the Prior Art

Various mechanisms have hitherto been proposed and put into practice for supplying a sheet film into a film loading device attached to an automatic processing machine from a film cassette. Such means for supplying sheet film from a film cassette to the film loading device have mostly been of the type in which a hinged cover of the cassette faced downward on the film loading device is opened upon insertion of the cassette into the film loading device.

Most of the cover opening means of the above-mentioned type utilize a cover latch release means which is operated in response to the inertion of the cassette. Such a cover opening means has been disadvantageous in that sometimes the cover happens to open upon insertion thereof into the film loading device when the cassette is carelessly pushed into the device. Further, for the same reason, the cassette sometimes opens at an undesired time or when the light shielding cover is still open. Therefore, there is the fear of carelessly exposing the film to ambient light, especially in the types of film cassettes handled in ambient light.

SUMMARY OF THE INVENTION

In view of the above-mentioned defects of conventional cassette cover opening means, the primary object of the present invention is to provide a means for opening a cover of a sheet film cassette in which the cover cannot be opened carelessly during the cassette insertion operation into the film loading device.

Another object of the present invention is to provide a casette cover opening means in which the cover of the cassette is opened only when a light shielding cover of the film loading device is closed to keep the film loading portion dark.

A still another object of the present invention is to provide a cassette cover opening means in which the hinged cover of the film cassette is opened in response to the operation of a latch release means actuated upon closure of a light shielding cover of the film loading device, whereby the cassette can be handled in the presence of ambient light.

Other objects, features and advantages of the present invention will be apparent from the following detailed description of a preferred embodiment thereof taken in conjunction with the accompanying drawing in which:

BRIEF DESCRIPTION OF THE DRAWINGS

FIG. 1 shows a vertical sectional view of a sheet film loading device for supplying a sheet of film into an automatic film processor, which loading device is provided with a means for opening a cover of a film cassette in accordance with an embodiment of the present invention.

FIG. 2 is a schematic cross sectional view of a cassette about to engage a latch release member in the means of the present invention.

DETAILED DESCRIPTION OF THE INVENTION

Referring now to the drawing which shows an embodiment of this invention, reference numeral 1 indicates a film cassette for retaining a sheet film and discharging it into a film loading device by opening the cover hinged thereof. The film cassette 1 is provided with a cover opening hole, notch or cut away portion 2 on the front face thereof so that a hinged cover 11 of the cassette hinged at the rear end of the cassette can be opened when a latch release member is brought into engagement with the hole or cut away portion 2 of the cassette 1.

The film cassette 1 is loaded in a film loading device 10 at the loading portion 3 thereof. The loading portion 3 is partly covered by a top plate 4 of the film loading device 10 and with a light shielding cover 5 hinged at 5a to one end of the top plate 4. The light shielding cover 5 has removably connected thereto a flexible light shielding member 6. The flexible light shielding member 6 covers the end of the film cassette 1 so that the cassette 1 can be pushed ahead into the film loading device by a hand over the light shielding member 6.

The light shielding member 6 can be any kind of material so long as it is opaque and flexible. In the embodiment shown in the drawing, the light shielding member 6 is of a bellows-like construction.

The reference numeral 7 indicates a cassette support frame on which the film cassette 1 is loaded and the cover 11 thereof is opened downward.

The hinged cover of the cassette 1 is latched in the closed position when the cassette is loaded into the film loading device on the frame 7 in the loading portion 3, and is opened when a latch release member is brought into engagement with the hole or cut away portion 2 of the cassette 1 mentioned above. Reference numeral 8 shows the latch release member projected in the direction of the film cassette 1 so that the hole or cut away portion 2 of the cassette 1 comes into engagement therewith when the cassette 1 is pushed up to the end of the slidable region on the support frame 7.

Above the film cassette loading portion 3 there is pivotally provided a control member 9 which has an engagement preventing portion 9a at the front end thereof. The control member 9 is pivotally mounted on a horizontal shaft 91 so that the engagement preventing portion 9a can come into and out of position to prevent hole 2 from falling into engagement with latch release member 8.

The other end or the rear end of the control member 9 has an upwardly bent portion 9b which is normally in abutment with the lower surface of the light shielding cover 5 hinged on the top of the film loading device 10. The control member 9 is normally urged to rotate counterclockwise in the drawing by the weight thereof and is held in such a position that the engagement preventing portion 9a thereof is out of position to prevent the engagement of the hole 2 and the latch release member 8 by the abutment of the rear end 9b thereof on the hinged cover 5 in its closed position.

When the hinged light shielding cover 5 is opened upward, the rear end 9b of the control member, which is materially urged upwardly, is allowed to move upward to rotate the control member 9 counterclockwise and permit the engagement preventing portion 9a of the control member 9 to fall into position to prevent the engagement of the hole 2 with the latch release member 8. Reference numeral 100 in FIG. 1 identifies a laterally slidable handle which can be used to adjust the width of the cassette support frame 7 so that cassettes of varying sizes can be loaded into the machine. It is not connected to control member 9.

In operation, the film cassette 1 is loaded in the film loading portion 3 of the film loading device 10 with the light shielding cover 5 open. Since the cover 5 is open, the rear end 9b of the control member 9 is allowed to move upward and consequently the front end or the engagement preventing portion 9a thereof is in its lower position to stop the cassette 1 in the position where the hole 2 is not engaged with the latch release member 8. Therefore, there is no fear of carelessly opening the cover 11 of the cassette 1 when the cassette 1 is inserted into the film loading device 10.

Thereafter, the light shielding cover 5 is closed to the lower position or the light shielding position as shown in the drawing. As the cover 5 is closed, the rear end 9b of the control member 9 is pushed downward by the cover 5 and the control member 9 is rotated clockwise against the weight thereof. Consequently, the front end or the engagement preventing portion 9a of the control member 9 is moved upward and brought out of engagement or abutment with the front end of the cassette 1 so that the cassette 1 can be pushed ahead up to the position where the hole 2 comes engagement with said latch release member 8.

The film cassette 1 can then be pushed ahead at the rear end thereof by a hand over the light shielding member 6 as mentioned hereinbefore. If the cassette 1 is pushed ahead at this stage (as shown in the drawing), the hole or out away portion 2 of the cassette 1 is brought into engagement with the latch release member 8 and the hinged cover 11 is opened downward as indicated by the chain lines. Thus, the cover 11 of the film cassette 1 can be opened only when the light shielding cover 5 is closed.

Since the light shielding cover 5 is closed and the flexible light shielding member 6 is closed when the cover 11 of the cassette 1 is opened and the sheet film is discharged out of the cassette, there is no fear of exposing the film to ambient light. By use of the above-described cover opening means in accordance with the present invention, it becomes possible to handle the film cassette in the presence of ambient light. Since an automatic film processor is equipped with light shielding means, it becomes possible to conduct the whole process of film development, including the loading of film, in the presence of ambient light in accordance with the present invention.

In order to take the film cassette out of the film loading device 10 after the film has been discharged by opening the cover 11, the light shielding cover 5 is opened and the cassette 1 is taken out by a hand. It is preferred to provide a microswitch or the like in the automatic processor or in the film loading device 10 to detect the completion of the loading of the film into the film processor in order to prevent careless opening of the light shielding cover 5 of the film loading device 10.

It will be readily understood that film cassettes of various sizes can be handled with this opening means by simply sliding a side guide means provided on the cassette support plate 7.

It should be noted that the cassette 1 can be pushed ahead without using the flexible light shielding member 6. For example, any conventional mechanical means can be used for moving the cassette along the support plate 7. Such a mechanical means for moving the cassette is preferred to be operable from outside the film loading device 10.

FIG. 2 is a cross sectional view of a cassette about to be opened by the means of the present invention where latch release member 8 (shown in detail in FIG. 1) is about to be engaged with the cassette, generally represented at 100. In FIG. 2, as the cassette 100 is pushed ahead, the notch or cut away portion 102 of the cassette 100 will be brought into engagement with the latch releasing member 8 of the means of the present invention. Inside the notch or cut away portion 102 of cassette 100 there is shown an engaging pin 103 which is biased forwardly by spring 104. When the latch release member 8 is pushed against the pin 103 in the notch or cut away portion 102, it forces the pin 103 back against the spring 104, thereby permitting the cassette cover 105 which may be, for instance, attached to the support fram 106 by means of hinge 107, to open in the downward direction, whereby the film in the interior of the cassette generally represented by 108 is permitted to fall downwardly from the cassettee 100. The arrow shows the direction from which the latch release member 8 will enter the notch or cutaway portion 102.

While the invention has been described in detail and with reference to specific embodiments thereof, it will be apparent to one skilled in the art that various changes and modifications can be made therein without departing from the spirit and scope thereof.

We claim:

1. A means for opening the cover of a film cassette comprising a light shielding cover for shielding a cassette loading portion from ambient light, said light shielding cover being movable between a closed position and an opened position, a projection means for opening the cover of the film cassette by engagement with a co-acting cover locking means of the film cassette when the film cassette is pushed forward in the cassette loading portion, and a control member pivotally mounted between said light shielding cover and said projection means, said control member having an engagement preventing portion for interrupting said engagement of the projection means and said hole and being associated with said light shielding cover so that said engagement preventing portion can be brought into position to interrupt said engagement when said light shielding cover is in the open position and retracted from said position when the cover is in the closed position, whereby the cover of the film cassette is opened only after the light shielding cover is in the closed position.

2. A means for opening the cover of a film cassette according to claim 1 wherein said light shielding cover is pivotally mounted above said cassette loading portion and is associated with one end of said control member to urge said control member to its retracted position, and said control member is urged to move into said interrupting position by a lesser force than that required to urge said cover into the closed position, whereby the control member is held in its retracted position when the cover is closed.

3. A means for opening a cover of a film cassette according to claim 2 wherein said control member is pivotally mounted on a fixed shaft and urged to move into the interrupting position by its own weight.

4. A means for opening a cover of a film cassette according to claim 1 further comprising a flexible light shielding member attached to said light shielding cover, whereby the film cassette can be pushed in by the tail end thereof with a hand from outside the flexible light shielding member after the cover is closed with the flexible light shielding member.

5. A means for opening a cover of a film cassette according to claim 4 wherein said flexible light shielding member is an opaque, bellows-type flexible material.

* * * * *